June 3, 1930. R. V. HUTCHINSON 1,761,921
SUPERCHARGER DRIVE
Filed Aug. 19, 1927 2 Sheets-Sheet 1
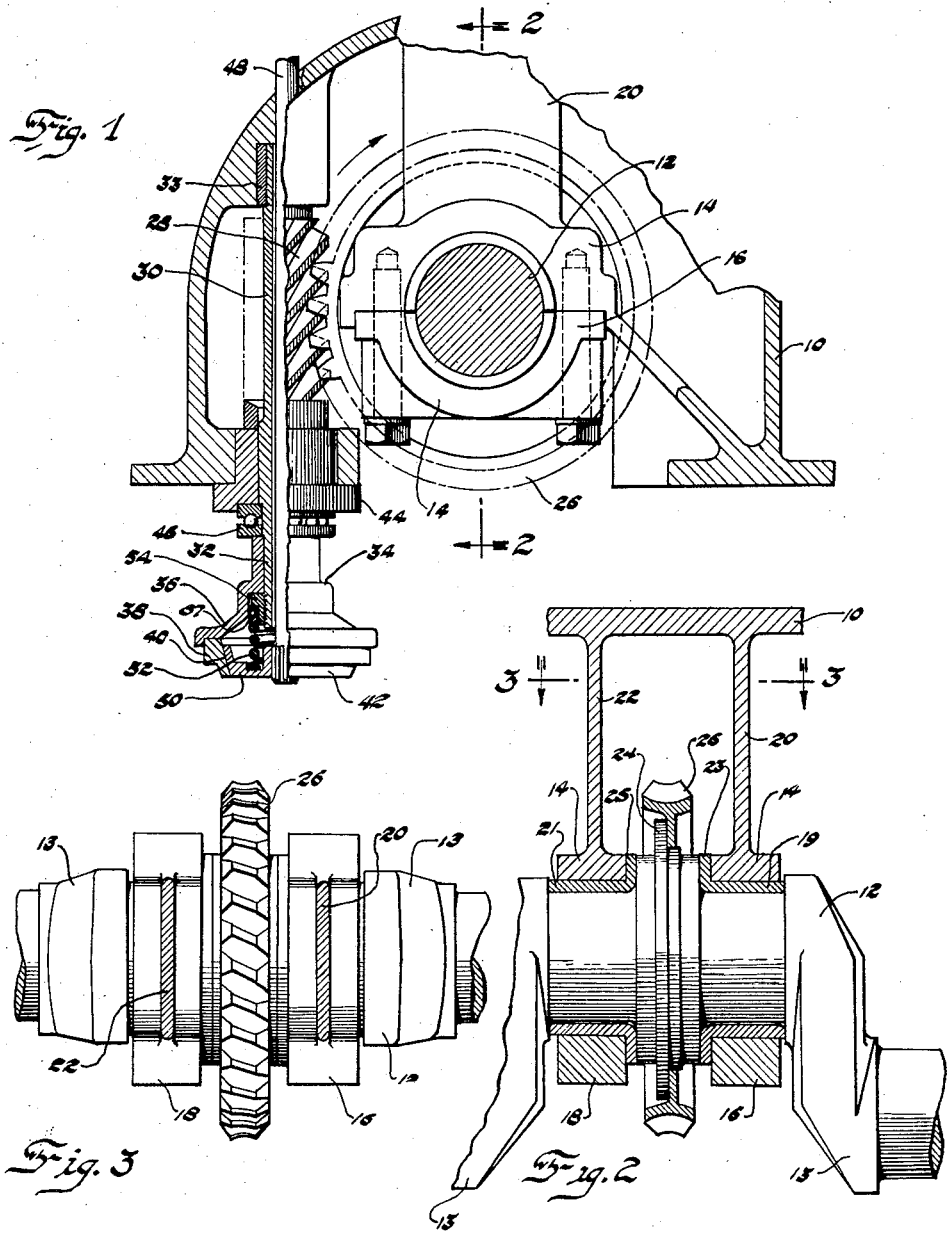

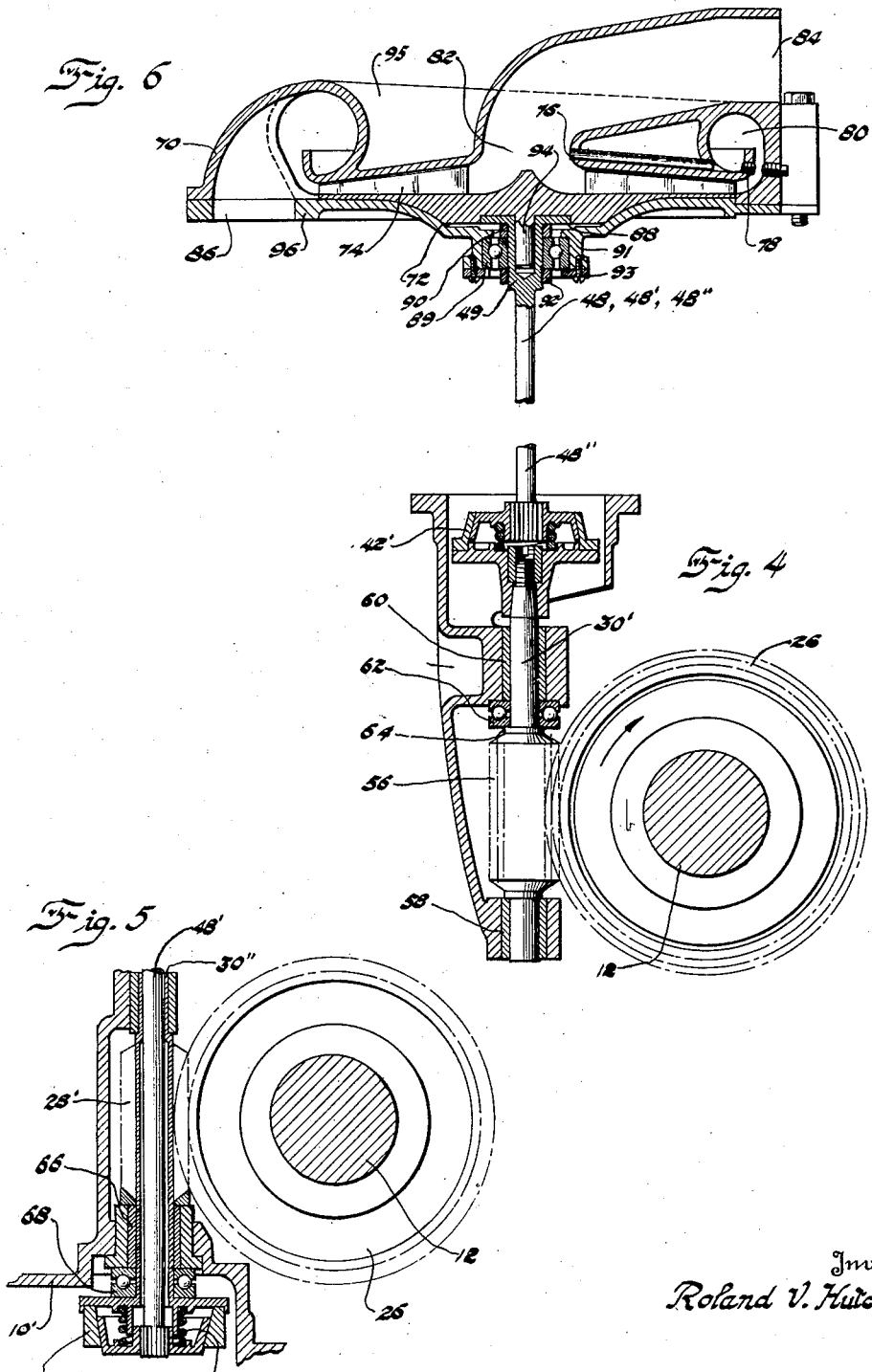

Patented June 3, 1930

1,761,921

UNITED STATES PATENT OFFICE

ROLAND V. HUTCHINSON, OF LANSING, MICHIGAN, ASSIGNOR TO GENERAL MOTORS RESEARCH CORPORATION, OF DETROIT, MICHIGAN, A CORPORATION OF DELAWARE

SUPERCHARGER DRIVE

Application filed August 19, 1927. Serial No. 214,036.

This invention relates to superchargers for internal combustion engines used on automotive vehicles and has particular reference to the driving mechanism for the supercharger.

In the past superchargers have been driven from the crankshaft, usually the front end, or at times from the camshaft. These drives have involved certain difficulties of installation and operation and inconveniences in assembly and it is the purpose of the present invention to build in the crankcase a drive which will remove the objections of the prior constructions.

The essential part of the drive consists in taking the power from the crankshaft at one of the center bearings. This bearing is split and between the two halves thereof there is secured to the crankshaft a gear which in turn meshes with a gear secured to a shaft which extends vertically through the crankcase for operating the supercharger which is placed above the engine. The driven shaft is preferably made in two sections which are interconnected by a spring-pressed clutch which is adapted to slip at overloads or during spurts of the engine in order that the mechanism will not be damaged or broken, due to excessive strains on the working parts.

The supercharger used in connection with the present invention is generally of the conventional, centrifugal type but has as its distinguishing feature the provision of a plurality of tubes which lead from a gutter at the outer extremity of the supercharger toward the intake port at the center thereof. The purpose of these tubes is to conduct back to the inlet any unvolatilized fuel which may reach the outer or compression chamber of the supercharger.

The invention is disclosed in the accompanying drawing in which:

Figure 1 is a section through the crankcase of an automotive vehicle showing the application of the supercharger drive.

Figure 2 is a section on the line 2—2 of Figure 1 and shows the split center bearing and the application of the gear thereto.

Figure 3 is a plan view of the structure of Figure 2 taken on the line 3—3 of Figure 2.

Figures 4 and 5 are sectional views of modified forms of the drive shown in Figure 1.

Figure 6 is a sectional view through the supercharger used in connection with the drive in Figures 1, 4 and 5, the section being taken through one of the tubes used for the return of unvolatilized fuel.

Referring to the numbered parts on the drawing, 10 indicates the crankcase of an internal combustion engine, 12 is the crankshaft, 13 the throws thereof and 14 one of the bearings which supports the shaft. The bearing 14, as will be seen from Figures 2 and 3, is composed of two smaller bearing sections 16 and 18, supported by the crankcase by means of the ribs 20 and 22. Bushings 19 and 21, having flanged portions 23 and 25 are provided between the crankshaft 12 and the ribs 20 and 22.

Between the flanges 23 and 25 and the bearing halves 16 and 18, the crankshaft 12 has a flange 24, to which is secured the gear 26, which drives the gear 28, integral with a vertical hollow shaft 30, extending below the crankcase as shown at 32 in Figure 1. The shaft 30 extends vertically through the crankcase and has an upper bearing at 33 and a lower bearing at 44.

To the lower end of the hollow shaft 30 there is secured in any suitable way a collar 34, the lower end of which terminates in a cup-shaped portion 36, to which is secured a ring 38, having an inner conical surface as shown at 40, and which forms one-half of a clutch member indicated as a whole at 42. At the lower end of the crankcase there is provided a plain bearing member in the form of a headed bushing 44 and between the bushing 44 and the collar 34 a ball bearing 46 is provided to take up the thrust and to allow for the free rotation of the parts.

Within the hollow shaft 30 there is positioned a second shaft 48, the lower end of which has splined thereon the hollow cone 50, which is constantly urged downwardly by means of a coil spring 52, one end of which abuts against a ball bearing 87 positioned against a headed collar 54, screw-threaded onto the lower end 32 of the hollow shaft 30. The opposite end of the spring rests in the cup of the cone 50.

The function of the spring-pressed cone 50 is to allow for a slippage between the cone surfaces 40 and 50 during overloads or sudden spurts of the engine. During overloads and because of the rapid change of speed of the engine there will be the tendency to damage or break a positive supercharger drive mechanism but by the provision of the slipping clutch any excessive overloads will be taken up in the clutch member per se due to the slip between the surfaces of the cones. In actual practice the mechanism is designed to slip at four times normal torque of maximum speed and load, but this may vary according to the conditions.

Referring to the structure of Figure 4 the gear 26 is similar in all respects to the gear shown in Figure 1. Meshing with the gear 26 is a gear 56, having bearings 58 and 60 at its lower and upper portions respectively. Applied to the upper end of the gear is a spring-pressed cone clutch 42′ the construction and operation of which are essentially the same as the clutch 42 of Figure 1. A ball bearing 62 is provided between the bearing 60 and a collar 64 on the shaft 30′ to take up thrust. On the other side of the clutch is a shaft 48″ which drives the supercharger.

In the structure of Figure 5 the gear 26 is similar to that of Figure 1. Driven by the gear 26 is a gear 28′ integral with a hollow shaft 30″ which extends slightly below the crankcase 10′. The lower portion of the shaft 30″ is set in a bearing 66 and between this bearing and the spring operated clutch 42″ there is positioned a ball thrust bearing 68 to take up thrust from the shaft 30″. Within the hollow shaft 30″ there is positioned a second shaft 48′ which extends upwardly over the engine block to drive the supercharger. The clutch member 42″ is substantially the same as that shown in Figures 1 and 4 and its operation is in all respects similar.

The shafts 48, 48′ or 48″ are secured to the rotor 72 as shown at 49 in Figure 6. The shaft has a flange 88 to which the rotor 72 is secured. The shaft end is hollow to receive a pin 94 integral with the rotor. A ball bearing 89 surrounds the shaft and is spaced from the flange 88 by a collar 90. The bearing 89 is positioned in an extension 91 of the lower portion 96 of the supercharger housing 95 and is held in place by a nut 92 and the cover member 93.

If desired the gears 28 or 28′ and their associated shafting may be removed from below by removing the bushing 44 or bearing 66.

The supercharger of the present invention is shown as a whole at 70 in Figure 6 and is preferably though not necessarily placed above the engine. The supercharger is generally of the conventional, centrifugal type and has the blades 74 and the usual rotor 72 driven by shafts 48, 48″ or 48′ of Figures 1, 4 and 5. The essential feature of the supercharger is the provision of a plurality of tubes 76 which extend to the inlet 82 from a gutter or trough 78 provided within the compression chamber 80 of the supercharger. Only one of these tubes is shown but as many as desired may be provided. When the rotor 72 is in operation the pressure difference between the compression chamber 80 and the inlet 82 will cause a flow through the tube 76 of any unvolatilized fuel which has reached the compression chamber 80 and fallen into the trough 78. By returning the unvolatilized fuel to the inlet 82, the speed with which it is driven through the rotor will tend to break it up into the atomized state.

The entrance from the carburetor is shown at 84 and the outlet to the engine is shown at 86.

While the supercharger shown in Figure 6 is to be preferred it is obvious that any suitable type of supercharger may be used in connection with the drives shown on the drawing. The disclosure of the present invention is particularly adapted to superchargers of the type shown when placed horizontally above an L-head engine.

I claim:

1. In combination with an internal combustion engine having a crank shaft having end and intermediate bearings, one of said intermediate bearings formed of two bearing portions, a worm wheel rigid with said shaft between said bearing portions, a worm meshing with said wheel, a hollow shaft rigid with said worm, a shaft in said hollow shaft and driven thereby, and a supercharger driven from said last named shaft.

2. In combination with an internal combustion engine having a crank shaft having end and intermediate bearings, one of said intermediate bearings formed of two bearing portions, a worm wheel rigid with said shaft between said bearing portions, a worm meshing with said wheel, a hollow shaft rigid with said worm, a shaft in said hollow shaft and driven thereby, a drive connection between said shaft permitting slipping at overloads, and a supercharger driven from said last named shaft.

3. In combination with an internal combustion engine having a crank shaft having end and intermediate bearings, one of said intermediate bearings formed of two bearing portions, a worm wheel rigid with said shaft between said bearing portions, a worm meshing with said wheel, a hollow shaft rigid with said worm, a shaft in said hollow shaft, a spring operated cone clutch forming a drive connection between said shafts, and a supercharger driven from said last named shaft.

4. In combination with an internal combustion engine having a crank shaft having end and intermediate bearings, one of said intermediate bearings formed of two bearing portions, a worm wheel rigid with said shaft between said bearing portions, a worm meshing with said wheed, a hollow vertical shaft rigid with said worm and having its bearings in the crank case, a shaft in said hollow shaft, a slipping clutch connecting said shafts, and an overhead supercharger driven from said last named shaft.

In testimony whereof I affix my signature.

ROLAND V. HUTCHINSON.